(12) United States Patent
Caviedes et al.

(10) Patent No.: US 11,936,915 B2
(45) Date of Patent: Mar. 19, 2024

(54) METHOD AND APPARATUS FOR ADAPTIVELY REDUCING ARTIFACTS IN BLOCK-CODED VIDEO

(71) Applicant: INTEL CORPORATION, Santa Clara, CA (US)

(72) Inventors: Jorge E. Caviedes, Mesa, AZ (US); Mahesh M. Subedar, Laveen, AZ (US); Khasim S. Dudekula, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/090,310

(22) Filed: Dec. 28, 2022

(65) Prior Publication Data

US 2023/0134137 A1    May 4, 2023

Related U.S. Application Data

(63) Continuation of application No. 17/488,062, filed on Sep. 28, 2021, now Pat. No. 11,546,639, which is a
(Continued)

(51) Int. Cl.
| | |
|---|---|
| *H04N 19/80* | (2014.01) |
| *H04N 19/117* | (2014.01) |
| *H04N 19/136* | (2014.01) |
| *H04N 19/14* | (2014.01) |
| *H04N 19/176* | (2014.01) |

(Continued)

(52) U.S. Cl.
CPC .......... *H04N 19/80* (2014.11); *H04N 19/117* (2014.11); *H04N 19/136* (2014.11); *H04N 19/14* (2014.11); *H04N 19/176* (2014.11); *H04N 19/44* (2014.11); *H04N 19/86* (2014.11); *H04N 19/172* (2014.11); *H04N 19/182* (2014.11); *H04W 84/18* (2013.01)

(58) Field of Classification Search
CPC .... H04N 19/117; H04N 19/136; H04N 19/14; H04N 19/172; H04N 19/176; H04N 19/182; H04N 19/44; H04N 19/80; H04N 19/86
USPC ...................................................... 375/240.24
See application file for complete search history.

(56) References Cited

U.S. PATENT DOCUMENTS

| | | |
|---|---|---|
| 5,832,115 A | 11/1998 | Rosenberg |
| 7,003,174 B2 | 2/2006 | Kryukov et al. |

(Continued)

FOREIGN PATENT DOCUMENTS

| | | | | |
|---|---|---|---|---|
| WO | WO-2006095501 A1 | * | 9/2006 | ............. H04N 19/11 |

OTHER PUBLICATIONS

Final Office Action for U.S. Appl. No. 11/125,948, dated Jan. 8, 2010.
(Continued)

*Primary Examiner* — Behrooz M Senfi
(74) *Attorney, Agent, or Firm* — Essential Patents Group, LLP

(57) ABSTRACT

Apparatus, systems and methods for adaptively reducing blocking artifacts in block-coded video are disclosed. In one implementation, a system includes processing logic at least capable of deblock filtering at least a portion of a line of video data based, at least in part, on edge information and texture information to generate at least a portion of a line of deblocked video data, and an image data output device responsive to the processing logic.

20 Claims, 8 Drawing Sheets

Related U.S. Application Data continuation of application No. 17/037,279, filed on Sep. 29, 2020, now Pat. No. 11,172,233, which is a continuation of application No. 16/593,710, filed on Oct. 4, 2019, now Pat. No. 10,863,204, which is a continuation of application No. 15/271,152, filed on Sep. 20, 2016, now Pat. No. 10,440,395, which is a continuation of application No. 14/563,017, filed on Dec. 8, 2014, now Pat. No. 9,560,382, which is a continuation of application No. 13/960,325, filed on Aug. 6, 2013, now Pat. No. 9,020,046, which is a continuation of application No. 11/125,948, filed on May 9, 2005, now Pat. No. 8,520,739.

(51) Int. Cl.
*H04N 19/44* (2014.01)
*H04N 19/86* (2014.01)
*H04N 19/172* (2014.01)
*H04N 19/182* (2014.01)
*H04W 84/18* (2009.01)

(56) References Cited

U.S. PATENT DOCUMENTS

| | | | |
|---|---|---|---|
| 7,092,573 B2 * | 8/2006 | Luo | G06V 10/26 |
| | | | 382/254 |
| 7,123,776 B2 | 10/2006 | Jung | |
| 7,362,377 B2 | 4/2008 | Caviedes | |
| 7,382,417 B2 | 6/2008 | Caviedes | |
| 7,423,691 B2 | 9/2008 | Crlick et al. | |
| 7,508,448 B1 | 3/2009 | Lew et al. | |
| 7,567,294 B2 | 7/2009 | Lu et al. | |
| 7,680,355 B2 | 3/2010 | Chiu et al. | |
| 8,520,739 B2 * | 8/2013 | Caviedes | H04N 19/44 |
| | | | 382/268 |
| 9,369,735 B2 | 6/2016 | Caviedes | |
| 9,560,382 B2 | 1/2017 | Caviedes | |
| 9,930,366 B2 | 3/2018 | Zheng et al. | |
| 2002/0136303 A1 | 9/2002 | Sun et al. | |
| 2002/0140854 A1 | 10/2002 | Lan et al. | |
| 2003/0081854 A1 * | 5/2003 | Deshpande | H04N 5/208 |
| | | | 382/268 |
| 2005/0100235 A1 | 5/2005 | Kong et al. | |
| 2005/0196063 A1 | 9/2005 | Guangxi et al. | |
| 2006/0110062 A1 | 5/2006 | Chiang et al. | |
| 2006/0110065 A1 * | 5/2006 | Huang | H04N 19/61 |
| | | | 375/E7.176 |
| 2006/0126093 A1 | 6/2006 | Fedorovskaya et al. | |
| 2006/0126962 A1 * | 6/2006 | Sun | H04N 19/895 |
| | | | 382/268 |
| 2006/0215058 A1 | 9/2006 | Lu et al. | |
| 2006/0245506 A1 * | 11/2006 | Lin | H04N 19/60 |
| | | | 375/E7.193 |
| 2006/0251174 A1 | 11/2006 | Caviedes | |
| 2007/0081598 A1 | 4/2007 | Schoenborn | |
| 2012/0087411 A1 | 4/2012 | Haskel | |
| 2015/0092866 A1 | 4/2015 | Cavides et al. | |

OTHER PUBLICATIONS

Final Office Action for U.S. Appl. No. 11/125,948, dated Jul. 18, 2011.
Final Office action for U.S. Appl. No. 14/563,026, dated Oct. 29, 2015.
Final Office Action for U.S. Appl. No. 15/271,152, dated Nov. 19, 2018.
Non Final Office Action for U.S. Appl. No. 11/125,948, dated Jan. 31, 2011.
Non Final Office Action for U.S. Appl. No. 13/960,325, dated Aug. 28, 2014.
Non Final Office Action for U.S. Appl. No. 11/125,948, dated Jun. 8, 2009.
Non Final Office Action for U.S. Appl. No. 14/563,026, dated May 20, 2015.
Non-Final Office Action for U.S. Appl. No. 14/563,017 dated Feb. 1, 2016, 9 pages.
Non-Final Office Action for U.S. Appl. No. 15/271, 152, dated May 9, 2018.
Notice of Allowance for U.S. Appl. No. 14/563,017 dated Jun. 6, 2016, 7 pages.
Notice of Allowance for U.S. Appl. No. 11/125,948 dated Mar. 18, 2013.
Notice of Allowance for U.S. Appl. No. 13/960,325, dated Jan. 6, 2015.
Notice of Allowance for U.S. Appl. No. 14/563,026, dated Feb. 3, 2016.
Notice of Allowance for U.S. Appl. No. 15/271,152, dated Jun. 7, 2019.
Notice of Allowance for U.S. Appl. No. 16/593,710, dated Aug. 18, 2020.
Notice of Allowance for U.S. Appl. No. 17/037,279, dated Jul. 22, 2021.
U.S. Appl. No. 11/021,779, filed Dec. 23, 2004, Inventor: Caviedes.
U.S. Appl. No. 11/022,625, filed Dec. 27, 2004, Inventor: Caviedes.
U.S. Appl. No. 11/091,853, filed Mar. 28, 2005, Inventor: Lu, Tsung-Hsin, et al.
U.S. Appl. No. 11/120,106, filed May 2, 2005, Inventor: Chiu, Yi-Jen et al.
Notice of Allowance for U.S. Appl. No. 17/488,062, dated Sep. 19, 2022.

* cited by examiner

METHOD AND APPARATUS FOR ADAPTIVELY REDUCING ARTIFACTS IN BLOCK-CODED VIDEO

CLAIM OF PRIORITY

This application is a continuation of U.S. patent application Ser. No. 17/488,062, filed Sep. 28, 2021, which is a continuation of U.S. patent application Ser. No. 17/037,279, filed Sep. 29, 2020, now U.S. Pat. No. 11,172,233, which is a continuation of U.S. patent application Ser. No. 16/593,710, filed Oct. 4, 2019, now U.S. Pat. No. 10,863,204, which is a continuation of U.S. patent application Ser. No. 15/271,152, filed Sep. 20, 2016, now U.S. Pat. No. 10,440,395, which is a continuation of U.S. patent application Ser. No. 14/563,017, filed Dec. 8, 2014, now U.S. Pat. No. 9,560,382, which is a continuation of U.S. patent application Ser. No. 13/960,325, filed Aug. 6, 2013, now U.S. Pat. No. 9,020,046, which is a continuation of U.S. patent application Ser. No. 11/125,948, filed May 9, 2005, now U.S. Pat. No. 8,520,739, which are incorporated herein by reference in their entireties for all purposes.

BACKGROUND

Block-encoded video, such as video encoded using techniques compatible with the Moving Picture Experts Group (MPEG) (e.g., MPEG-2, ISO/IEC 13818, also ITU-T Rec. H.262 (2002); and/or MPEG-4, ISO/IEC 14496 also ITU-T Rec. H.264 (2003)), may suffer from discontinuities at block boundaries particularly when encoded at low bit rates where large quantization errors may occur. Such discontinuities may appear in the reconstructed video frames as blocking artifacts (e.g., visible block edges, mosaic patterns, tiling effects, etc) particularly in image regions that are smooth.

Deblocking filters implementing methods such as variable length filtering and/or edge protection may reduce the magnitude of blocking artifacts to a visually-acceptable level. However, some techniques for reducing blocking artifacts do not adequately distinguish real edges in an image frame from artifact edges. Resources may be expended on filtering artificial edges (i.e., blocking artifacts) that are unlikely to be visually detectable.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings.

DETAILED DESCRIPTION

The following detailed description refers to the accompanying drawings. The same reference numbers may be used in different drawings to identify the same or similar elements. In the following description specific details may be set forth such as particular structures, architectures, interfaces, techniques, etc. in order to provide a thorough understanding of the various aspects of the claimed invention. However, such details are provided for purposes of explanation and should not be viewed as limiting with respect to the claimed invention. With benefit of the present disclosure it will be apparent to those skilled in the art that the various aspects of the invention claimed may be practiced in other examples that depart from these specific details. Moreover, in certain instances, descriptions of well known devices, circuits, and methods are omitted so as not to obscure the description of the present invention with unnecessary detail.

Figure 1:
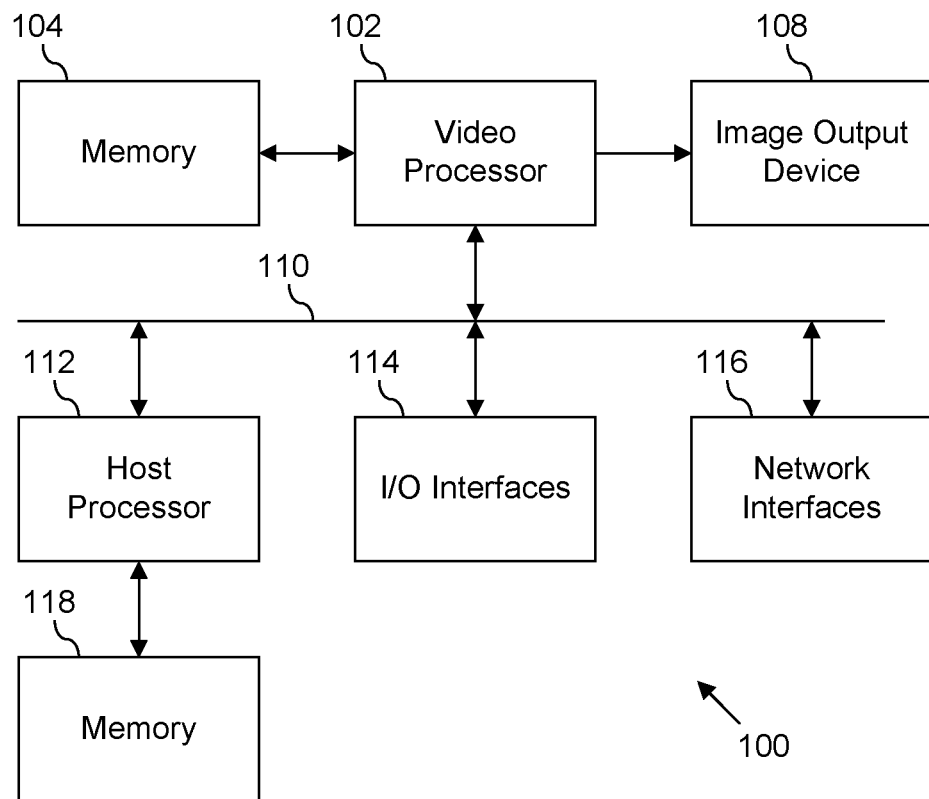
FIG. 1 illustrates an example image processing system.

FIG. 1 illustrates an example system 100 according to one implementation of the invention. System 100 may include one or more video processors 102, memory 104, and one or more image data output devices 108. In addition, in one implementation, processor 102 may communicate over a shared bus or other communications pathway 110 with a host processor 112, one or more input/output (I/O) interfaces 114 (e.g., universal synchronous bus (USB) interfaces, parallel ports, serial ports, telephone ports, and/or other I/O interfaces), and/or one or more network interfaces 116 (e.g., wired and/or wireless local area network (LAN) and/or wide area network (WAN) and/or personal area network (PAN), and/or other wired and/or wireless network interfaces). Host processor 112 may also communicate with one or more memory devices 118.

System 100 may assume a variety of physical implementations suitable for deblock filtering of block-coded video data. For example, image output device 108 may be implemented in a single device such as a digital television; while video processor 102, memory 104, host processor 112, interfaces 114/116, and memory 118 may be implemented in a device such as a set-top box (STB) coupled to output device 108 through communications pathway 110 (e.g., a digital transmission cable, a wireless network, etc.). Alternatively, all or most of the components of system 100 may be implemented in a single device such as a personal computer (PC), a networked PC, a server computing system, a handheld computing platform (e.g., a personal digital assistant (PDA)), cell phone, etc. Moreover, while components of system 100 may be implemented within a single device, such as a system-on-a-chip (SOC) integrated circuit (IC), components of system 100 may also be distributed across multiple ICs or devices.

Video processor 102 may include one or more devices and/or logic modules capable of performing one or more video processing functions. In one implementation, video processor 102 may receive decoded MPEG compliant video data (e.g., in the form of frames of decoded image data comprising blocks of individual pixel values) from memory 104 and/or from processor 112 or other video data sources coupled to system 100 through interfaces 114/116. In one implementation, video processor 102 may be used for implementing methods for adaptively reducing blocking artifacts in block-coded video (i.e., for adaptively deblocking video data) in accordance with the invention. Video processor 102 may output deblocked video data to memory 104 and/or image output device 108.

Memory 104 and/or memory 118 may be any device and/or mechanism capable of storing and/or holding color image data, color pixel data and/or component values, to name a few examples. For example, although the invention is not limited in this regard, memory 104 may be volatile memory such as static random access memory (SRAM) or dynamic random access memory (DRAM). For example, although the invention is not limited in this regard, memory 118 may be non-volatile memory such as flash memory.

Image data output device(s) 108 may include any of a number of mechanisms and/or device(s) that consume and/or display video data. For example, although the invention is not limited in this regard, image output device 108 may comprise a television display such as a cathode ray tube (CRT), liquid crystal display (LCD), etc. Those of skill in the art will recognize that certain image processing components (e.g., display processor) that would be necessary to implement the displaying of deblocked video by device 108 but that are not particularly germane to the claimed invention have been omitted from system 100 in the interest of clarity.

Host processor 112 may be, in various implementations, a special purpose or a general purpose processor. Further, host processor 112 may comprise a single device (e.g., a microprocessor or ASIC) or multiple devices. In one implementation, host processor 112 may be capable of performing any of a number of tasks that support methods for adaptively reducing blocking artifacts in block-coded video. These tasks may include, for example, although the invention is not limited in this regard, providing filter coefficients to video processor 102, downloading microcode to processor 102, initializing and/or configuring registers within processor 102, interrupt servicing, and providing a bus interface for uploading and/or downloading video data. In alternate implementations, some or all of these functions may be performed by processor 102.

Figure 2:
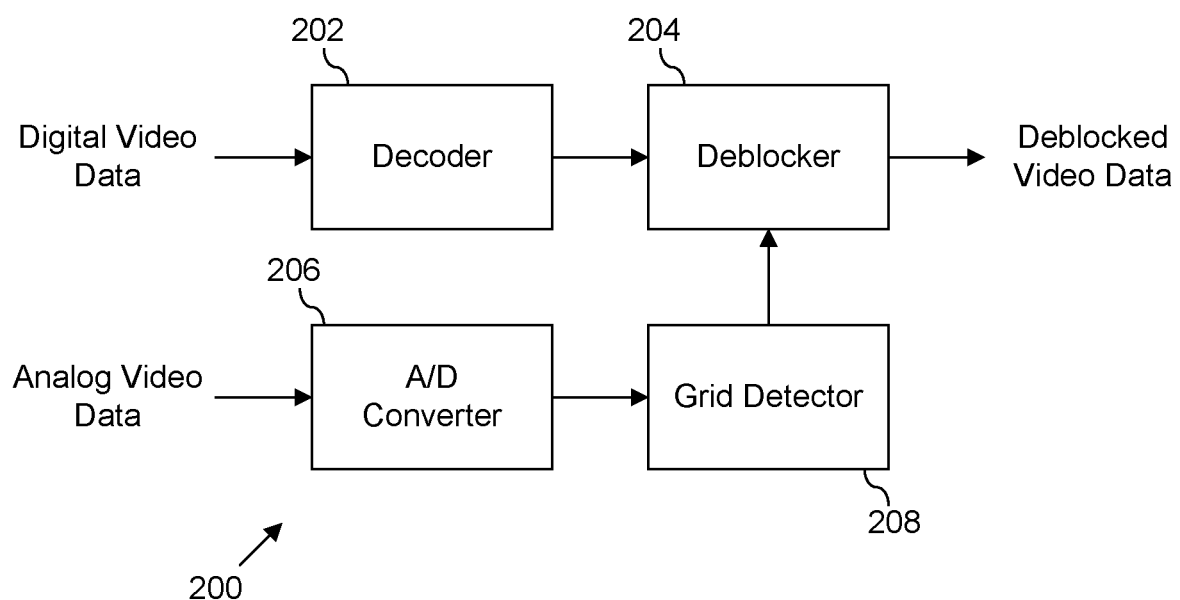
FIG. 2 illustrates portions of the image processor of FIG. 1 in more detail.

FIG. 2 is a simplified block diagram of portions of a video processor 200 (e.g., video processor 102, FIG. 1) for use in adaptively reducing blocking artifacts in block-coded video, in accordance with an implementation of the invention. Processor 200 includes a decoder 202, a deblocker 204, an A/D converter 206, and a grid detector 208. In one implementation, processor 200 may be implemented as a single IC implemented in, for example, a STB or a television. However, the invention is not limited in this regard and processor 200 may comprise a set of discrete ICs and/or need not be implemented in a single device such as a television.

Decoder 202 may comprise any device and/or combination of hardware, firmware and/or software capable of decoding block-encoded video data, such as video data encoded in compliance with MPEG-2 and/or MPEG-4 standards. Decoder 202 may decode input block-encoded digital video data in the form of a digital video signal input provided to decoder 202 over pathway 110. Alternatively, although the invention is not limited in this regard, processor 200 including decoder 202 may be implemented in a single device such as a television that obtains digital video signals from a remote source (e.g., video broadcaster) through a digital broadcast medium (e.g., cable modem, satellite broadcast signal, etc).

In accordance with the invention, deblocker 204 may comprise any device and/or combination of hardware, firmware and/or software capable of adaptively reducing blocking artifacts in decoded video data provided to deblocker 204 by decoder 202 and/or grid detector 208. In accordance with the invention, deblocker 204 may adaptively deblock video data obtained from decoder 202 and/or detector 208 and may provide the resulting deblocked video data to device 108. A more detailed description of deblocker 204 will be provided below with reference to FIGS. 3 and 4.

A/D converter 206 may comprise any device capable of both receiving analog video data, such as a decoded video data broadcast signal provided to converter 206 over pathway 110, and of converting that analog video data to digital video data. Grid detector 208 may comprise any device and/or combination of hardware, firmware and/or software capable of detecting the block encoding grid pattern of the decoded digital video data provided by converter 206 and of providing that data and associated block grid information to deblocker 204. The operation of decoder 202 and/or grid detector 208 will not be described in greater detail so as not to obscure details of the invention.

Figure 3:
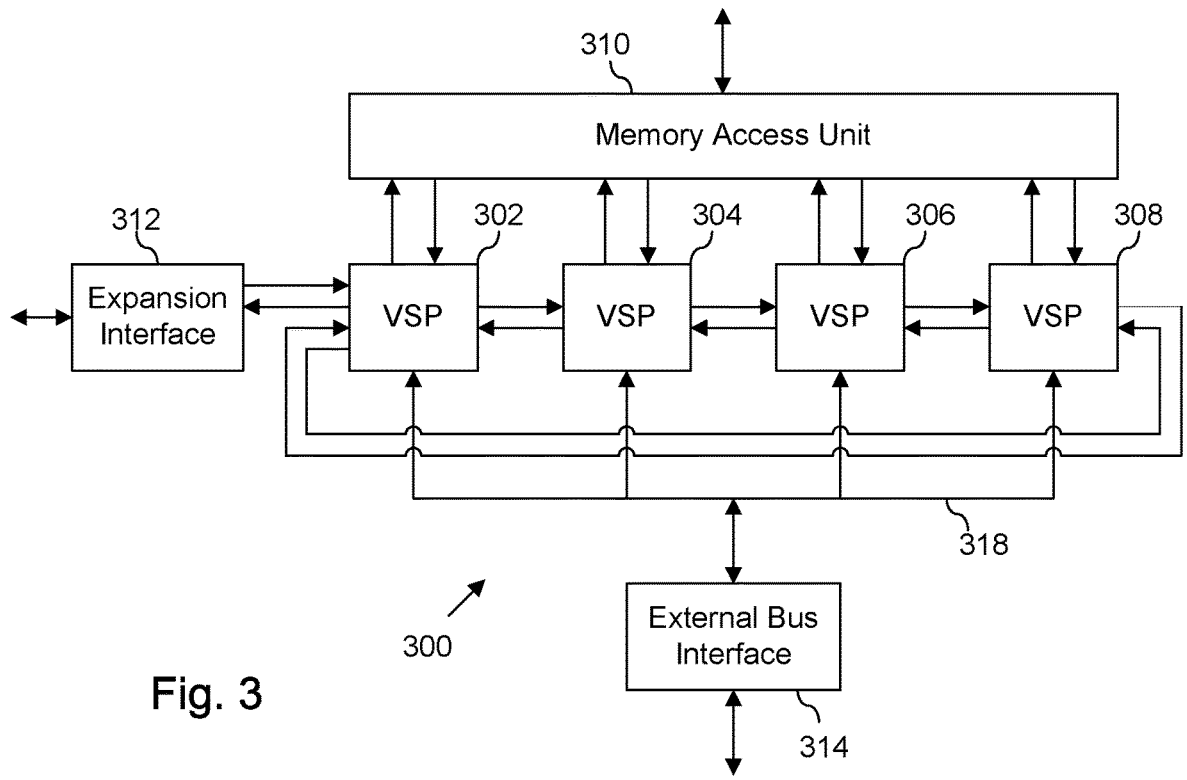
FIG. 3 illustrates portions of the deblocker of FIG. 2 in more detail.

FIG. 3 is a simplified block diagram of a video processing module 300 (e.g., deblocker 204 of FIG. 2) for use in adaptively reducing blocking artifacts in block-coded video, in accordance with an implementation of the invention. Module 300 may include one or more expansion interfaces 312, one or more memory access units 310, one or more external bus interfaces 314, and one or more video signal processors (VSPs) 302, 304, 306, and 308.

In one implementation, expansion interfaces 312 may enable video processing device 300 to be connected to other devices and/or integrated circuits (ICs) within a system (e.g., image output device 108 of FIG. 1). Each expansion interface 312 may be programmable to accommodate the device to which it is connected. In one implementation, each expansion interface 312 may include a parallel I/O interface (e.g., an 8-bit, 16-bit or other interface), and the expansion interfaces 312 may use the parallel I/O interface to simultaneously transfer data, such as video data, into and/or out of module 300.

Memory access unit 310 may enable data such as video data to be stored within and/or retrieved from an external memory device (e.g., memory 104 of FIG. 1). However, the invention is not limited in this regard, and, for example, module 300 may include internal memory (not shown) for storing and/or holding video data. In one implementation, memory access unit 310 may support a parallel (e.g., 8-bit, 16-bit or other) interface.

External bus interface 314 may enable module 300 to connect to an external communications pathway (e.g., bus 110 of FIG. 1). In one implementation, bus interface 314 may enable module 300 to receive video filter coefficients, microcode, configuration information, debug information, and/or other information or data from an external host processor (e.g., processor 112 of FIG. 1), and to provide that information to VSPs 302-308 via a global bus 318.

Video data may be adaptively deblock processed by one or more of VSPs 302-308. In one implementation, VSPs 302-308 may be interconnected in a mesh-type configuration via expansion interface 312, although the invention is not limited in this regard. VSPs 302-308 may process video data in parallel and/or in series, and each VSP 302-308 may perform the same or different functions. Further, VSPs 302-308 may have identical or different architectures. Although four VSPs 302-308 are illustrated, in other implementations module 300 may have more or fewer ISPs than VSPs 302-308.

In one implementation, at least one VSP 302-308 is capable of executing methods for adaptively reducing blocking artifacts in block-coded video in accordance with the invention. More particularly, at least one VSP 302-308 may implement methods for adaptively reducing blocking artifacts in block-coded video where filtering coefficients may be selected and/or reconfigured any number of times in accordance with the invention. Methods and apparatus for adaptively reducing blocking artifacts in block-coded video will be described in more detail below.

Figure 4:
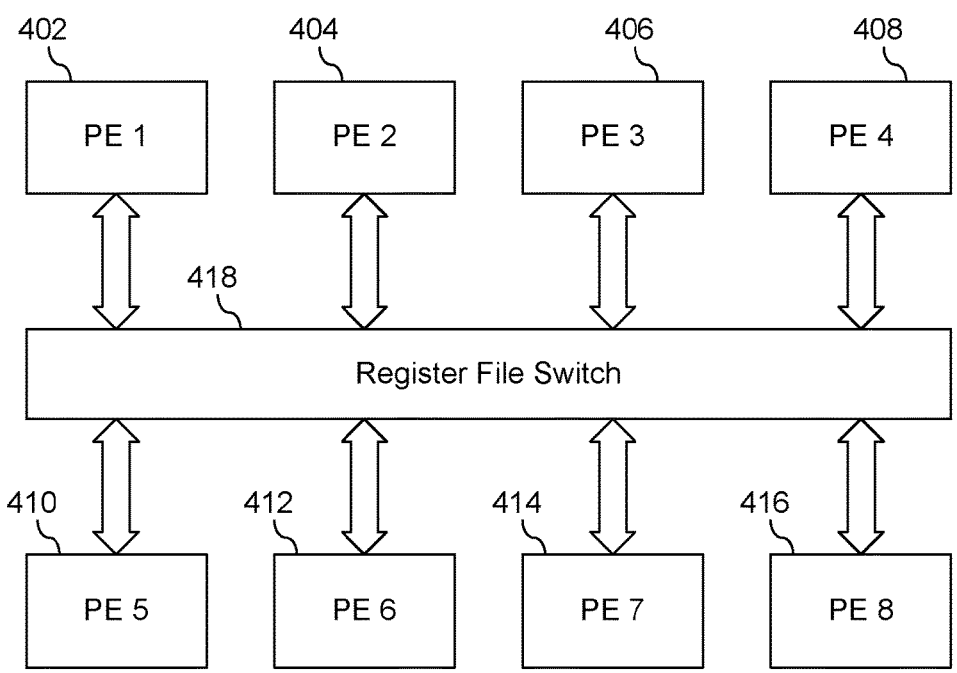
FIG. 4 illustrates portions of a video signal processor of FIG. 3 in more detail.

FIG. 4 is a simplified block diagram of portions of a video processing device 400, e.g., VSP 302 of FIG. 3, for use in adaptively reducing blocking artifacts in block-coded video in accordance with an implementation of the invention. In one implementation, device 400 includes processing elements (PEs) 402-416, and a register file switch 418. In one implementation, one or more of PEs 402-416 are capable of adaptively reducing blocking artifacts in decoded block-coded video data according to an implementation of the invention.

One or more of PEs 402-416 may be micro-engines capable of being programmed using micro-code provided, in one implementation, by host processor 112 (FIG. 1). Accordingly, one or more of PEs 402-416 may perform substantially the same and/or substantially different operations and may do so in a substantially parallel manner. Although eight PEs 402-416 are illustrated in FIG. 4, the invention is not limited in this regard and more or fewer PEs may be associated with a video processing device such as device 400. In one implementation, register file switch 418 may include a cross-bar switch. Accordingly, register file switch 418 may include communication registers useful for communicating information and/or data such as video pixel data and/or deblock filter coefficients between PEs 402-416.

Figure 5:
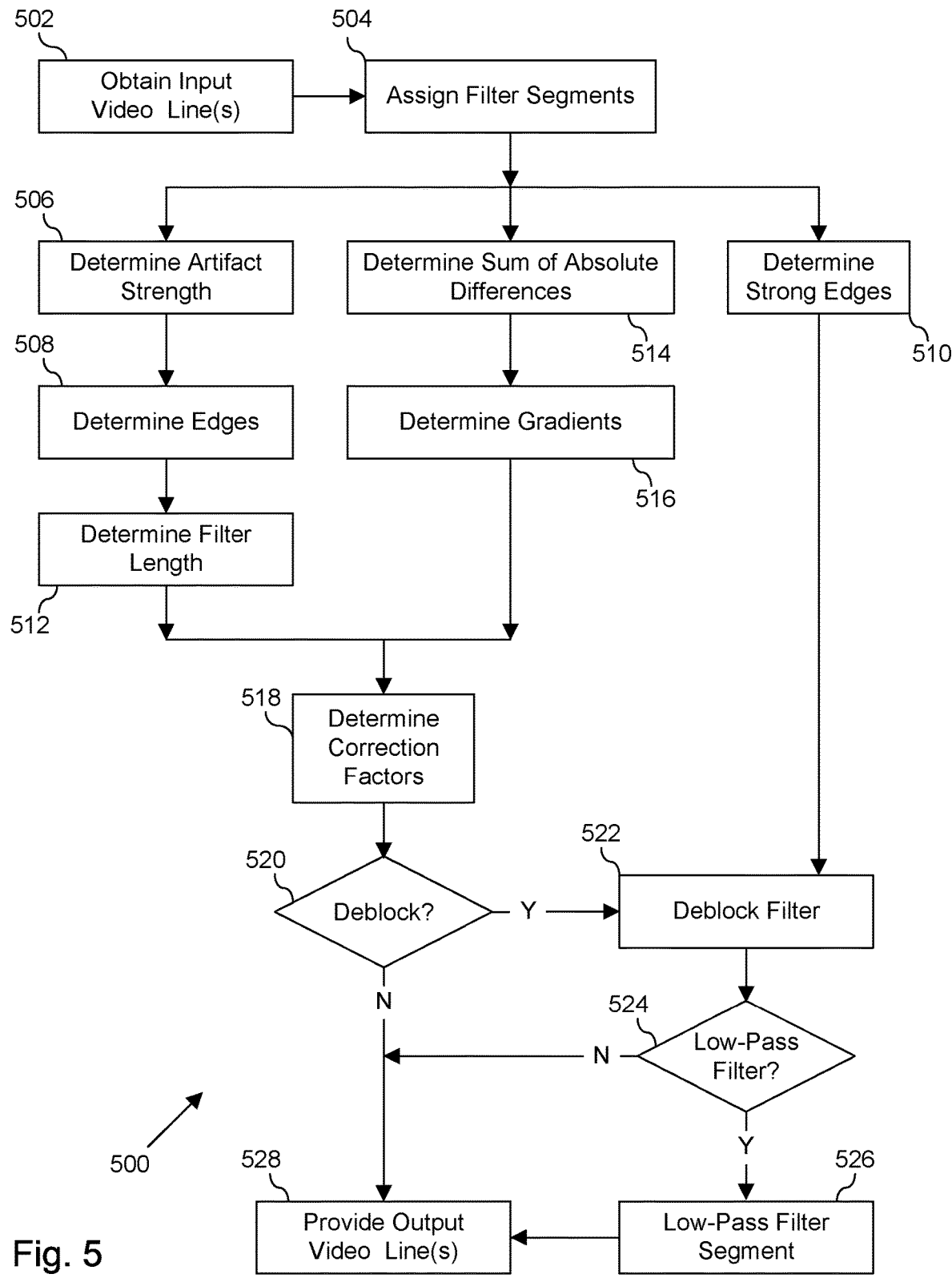
FIG. 5 is a flow chart illustrating an example process for adaptively reducing blocking artifacts in block-coded video.

FIG. 5 is a flow diagram illustrating a process 500 for adaptively reducing blocking artifacts in decoded block-coded video in accordance with the claimed invention. While, for ease of explanation, process 500, and associated processes, may be described with regard to system 100 of FIG. 1 and components thereof shown in FIGS. 2-4 (such as VSP 302 of FIG. 3), the claimed invention is not limited in this regard and other processes or schemes supported and/or performed by appropriate devices and/or combinations of devices in accordance with the claimed invention are possible. In addition, while process 500 will be described in the context of horizontal deblock filter processing, the claimed invention is not limited in this regard and those skilled in the art will recognize that process 500 may also be applied to vertical deblock filter processing without departing from the scope and spirit of the claimed invention.

Figure 6A:
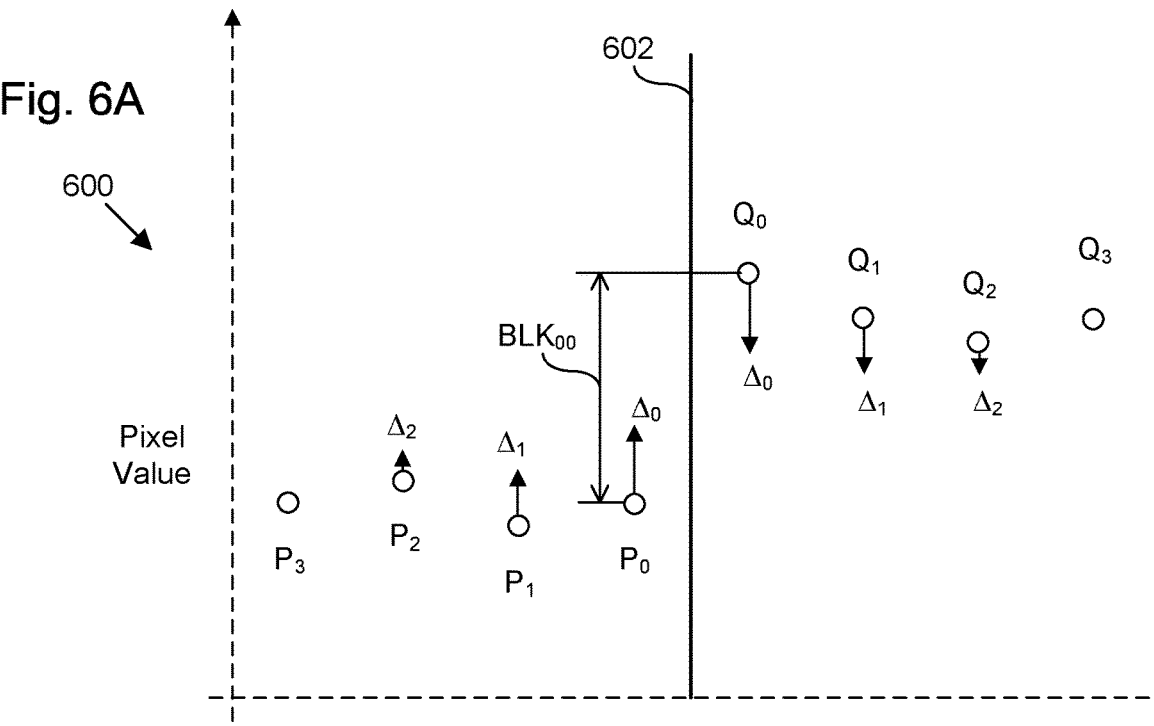
FIG. 6A illustrates a representative video pixel labeling scheme.
Figure 6B:
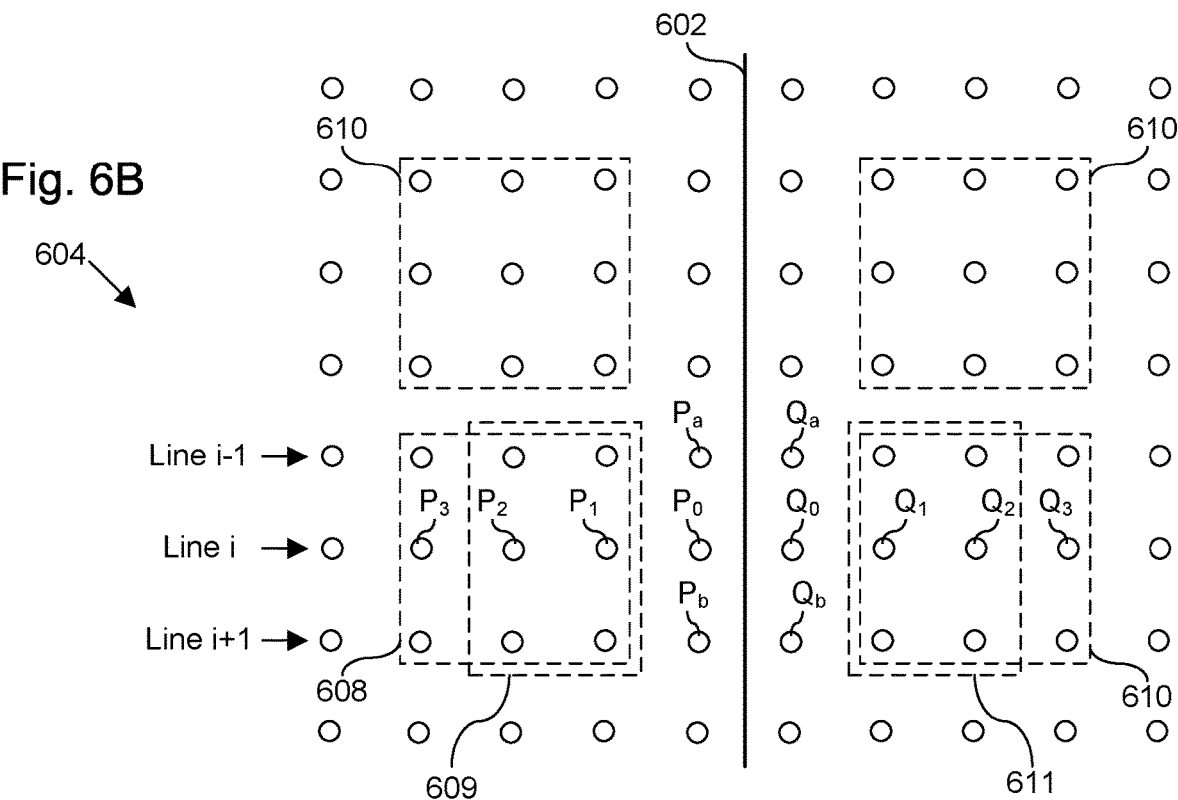
FIG. 6B illustrates representative video data quantities.

FIG. 6A illustrates some of the representative quantities that may be used to describe implementation of a deblocking filter in accordance with FIG. 5, and FIG. 6B illustrates an example labeling scheme offered to aid discussion of process 500. FIGS. 6A and 6B are offered solely to facilitate discussion of various implementations of process 500 and associated processes and are not limiting with regard to the claimed invention.

Referring to FIGS. 3-6B, process 500 may begin with obtaining of one or more decoded input video lines [act 502]. In one implementation, PE 402 of device 400 (e.g., deblocker 204 of FIG. 2) may obtain eight lines of video stored in memory 104 using switch 418 and memory access unit 310 to facilitate the data transfer. In one implementation, the input video data may comprise an eight row by ten column window 604 of lines of decoded video luminance data (i.e., luminance pixels) centered about a block boundary 602. In one implementation, if the upstream source of the decoded input video data is decoder 202 then deblocker 204 may also receive block grid information from decoder 202 to permit deblocker 204 to obtain input data windows centered about boundaries 602 in accordance with act 502. Alternatively, if the upstream source of the decoded input video data is A/D converter 206 then deblocker 204 may also receive block grid information from grid detector 208 to permit deblocker 204 to obtain input data windows centered about boundaries 602.

Process 500 may continue with assignment of filter segments [act 504]. One way to do this is to have deblocker 204 assign filter segments P and Q for each line being processed. For example, referring to FIG. 6B, for the video line being processed under process 500 (e.g., line "i") deblocker 204 may assign filter segment P to include pixels P3, P2, P1, and P0 while assigning filter segment Q to include pixels Q3, Q2, Q1, and Q0. In one implementation the P and Q filter segments may comprise those pixels (i.e., for segment P the pixels P3, P2, P1, and P0) of the line being processed that may have correction factors applied to them as will be described in further detail below.

Figure 7:
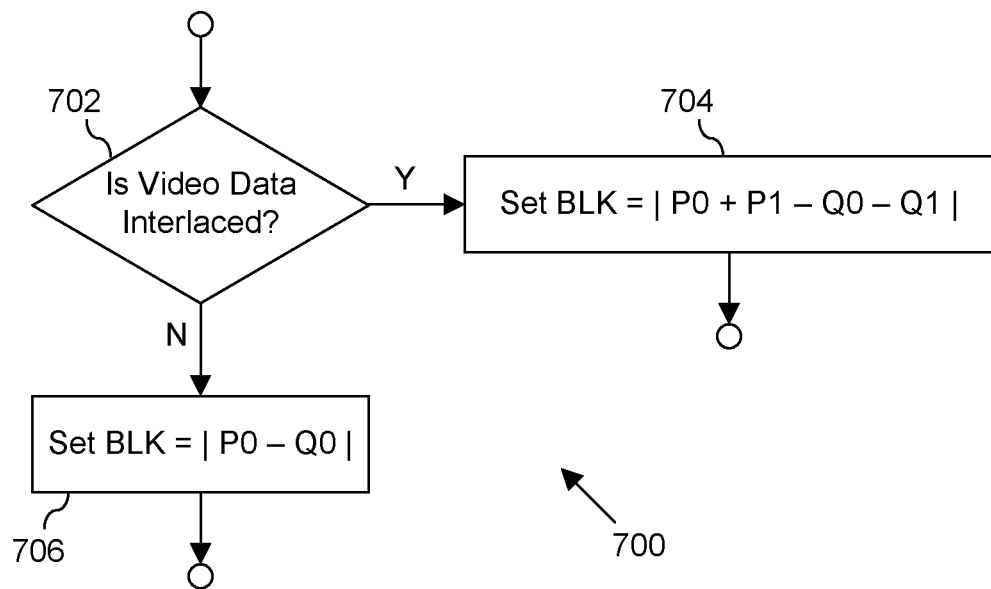
FIGS. 7-11 are flow charts illustrating respective portions of the process of FIG. 5 in greater detail.

Process 500 may continue with the determination of the blocking artifact strength [act 506]. FIG. 7 illustrates a process 700 for determining artifact strength in accordance with one implementation of act 506. Process 700 may begin with a determination of whether the video data obtained in act 502 is interlaced [act 702]. As those skilled in the art will recognize, one way to implement act 702 is to have deblocker 204 ascertain whether the video data is field coded. If the video data is interlaced and/or field coded then process 700 may continue with determination of a field coded artifact strength (BLK) [act 704] according to the following relationship:

$$BLK = |P0 + P1 - Q0 - Q1| \quad (1)$$

One way to do this is to have deblocker 204 determine the absolute value of the difference between the values of the sum of P0 and P1 and the sum of Q0 and Q1 pixels on either side of block boundary 602 to determine the artifact strength (i.e., to set a value for BLK according to equation 1).

Alternatively, if the video data is not interlaced and/or field coded then process 700 may continue with determination of the non-field coded artifact strength [act 706] according to the following relationship:

$$BLK = |P0 - Q0| \quad (2)$$

One way to do this is to have deblocker 204 determine the absolute value of the difference between the values of P0 and Q0 pixels on either side of block boundary 602 to determine the artifact strength (i.e., to set a value for BLK according to equation 2).

Those skilled in the art will recognize that an implicit threshold may be applied in conjunction with determining the artifact strength in act 506. In other words not all windows 604 having non-zero artifact strength may be selected for deblocking in process 500. This may be desirable when, for example, the magnitude of BLK is too small to be visually perceived. For example, according to one implementation of the invention, artifacts having BLK magnitudes less than a magnitude likely to be perceived when compared to well known visual perception thresholds (e.g., according to Webber's law) may be ignored in act 506.

Figure 8:
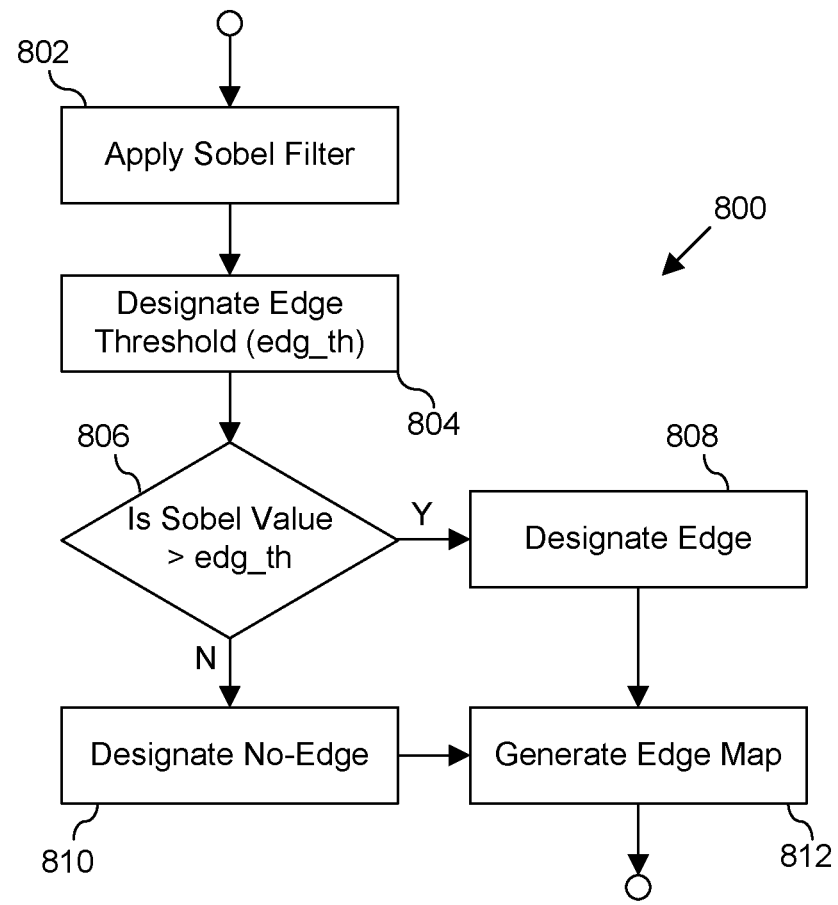

Process 500 may continue with the determination of edges [act 508]. FIG. 8 is a flow diagram of one implementation of a process 800 for determining edges in act 508 in accordance with the claimed invention. Process 800 may begin with the application of a Sobel filter [act 802]. In one implementation, for deblocking line i of window 604, a Sobel filter is applied to all pixels within the 3×3 pixel regions 608 and 610. As those skilled in the art will recognize, the respective Sobel filters for horizontal and vertical filtering may comprise:

$$S_H = (1/4)\begin{bmatrix} 1 & 2 & 1 \\ 0 & 0 & 0 \\ -1 & -2 & -1 \end{bmatrix} = (1/4)\begin{bmatrix} 1 \\ 0 \\ -1 \end{bmatrix}\begin{bmatrix} 1 & 2 & 1 \end{bmatrix} \quad (3)$$

$$S_V = (1/4)\begin{bmatrix} 1 & 0 & -1 \\ 2 & 0 & -2 \\ 1 & 0 & -1 \end{bmatrix} = (1/4)\begin{bmatrix} 1 \\ 2 \\ 1 \end{bmatrix}\begin{bmatrix} 1 & 0 & -1 \end{bmatrix}$$

Process 800 may continue with a designation of an edge threshold value edg_th [act 804]. For example, for the purposes of determining edges in accordance with act 508, deblocker 204 may designate a value of edg_th=25 where pixels in the video data have 8-bit values. Process 800 may then continue with a comparison of the Sobel value of each pixel in regions 608 and 610 to edg_th [act 806]. In other words, in one implementation, applying the horizontal Sobel filter SV to each pixel in regions 608 and 610 may generate a Sobel value for each of those pixels and for those pixels whose Sobel value exceeds edg_th an edge may be designated [act 808] while for those pixels whose Sobel value fails to exceed edg_th an edge may not be designated [act 810].

Subsequently, during either edge designation acts 808 and/or 810 and/or after all pixels have been processed through completion of acts 808 and 810, process 800 may complete with the generation of an edge map [act 812]. One way to do this is to have deblocker 204 assign a value of one to each pixel designated as an edge pixel in act 808 and a value of zero to each pixel designated as a non-edge pixel in act 810. In this manner deblocker 204 may generate an edge map representing all pixels within regions 608 and 610 that have Sobel values greater than 25 with an edge map value of one.

Referring again to FIG. 5, process 500 may continue with a determination of strong edges [act 510]. Referring again to process 800 of FIG. 8, one way to implement act 510 is to apply process 800 as described above with the exception that a larger edg_th value may be designated in act 804 so that an edge map corresponding to strong edges is generated in act 812. For example, for video data having 8-bit pixel values, deblocker 204 may designate a value of 65 for edg_th in act 804 so that for every pixel in regions 608 and 610 whose Sobel value exceeds 65 a value of one may be assigned in a strong edge map produced in act 812.

Figure 9:
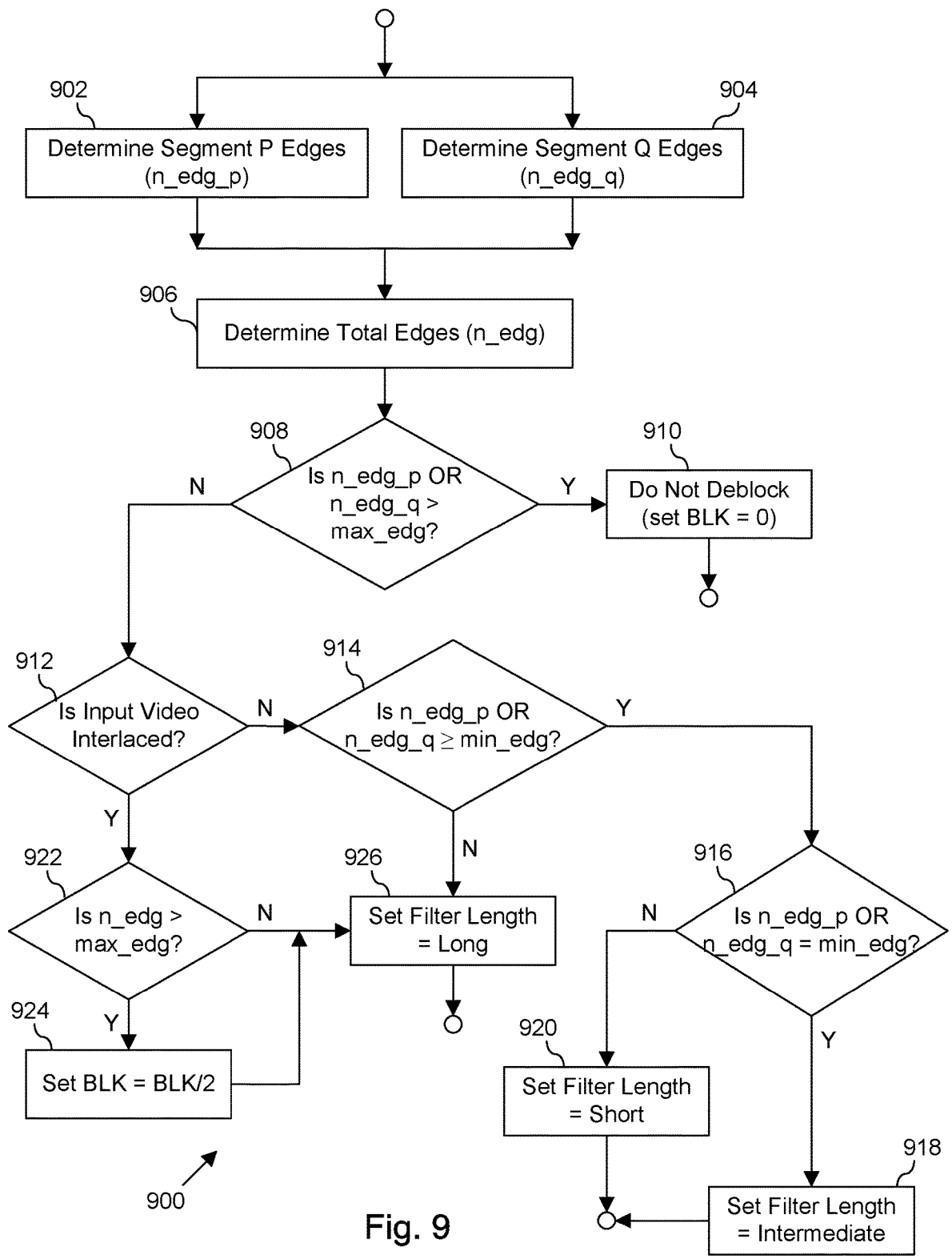

Process 500 may continue with a determination of deblock filter length [act 512]. FIG. 9 is a flow diagram illustrating one implementation of a process 900 for determining deblock filter length in act 512 in accordance with the claimed invention. Process 900 may begin with determinations of the number of edges in segments P [act 902] and Q [act 904]. One way to do this is for deblocker 204 to determine if any pixels of the respective segments are designated as being edge pixels in the edge map produced in act 508 and to count any such edge pixels to determine the respective edge numbers n_edg_p and n_edg_q. Process 900 may continue with a determination of the total number of edges [act 906]. In one implementation, deblocker 204 may add together the number of P segment edges (n_edg_p) and the number of Q edges (n_edg_q) to arrive at the total number of edges n_edg for the line being processed.

Process 900 may continue with a determination of whether either of edge values n_edg_p or n_edg_q is greater than a maximum number of edges max_edg [act 908]. One way to do this is to have deblocker 204 compare both n_edg_p and n_edg_q to a predetermined value for max_edg. In one implementation, deblocker 204 may be provided with a predetermined max_edg value by processor 112. If either n_edg_p or n_edg_q is greater than max_edg then the decision may be made to not deblock filter [act 910]. For example, to disable deblock filtering, deblocker 204 may set BLK to a value of zero in response to a positive determination in act 908.

In accordance with one implementation of the claimed invention, the specific value of max_edg may be based upon a determination that when the number of actual edges in the line being processed exceed that max_edg value then those edges may be unsatisfactorily degraded if deblock filtering were applied to that line of video data. In one implementation a value of seven for max_edg may provide satisfactory protection of actual edges in the video data being processed.

If the result of act 908 is negative then process 900 may continue with a determination of whether the input video data is interlaced video data [act 912]. If the video data is not interlaced then a determination is made as to whether n_edg_p or n_edg_q is greater than or equal to a minimum edge value min_edg [act 914]. One way to do this is to have deblocker 204 compare both n_edg_p and n_edg_q to a predetermined value for min_edg. In one implementation, deblocker 204 may be provided with a predetermined min_edg value by processor 112.

If either n_edg_p and/or n_edg_q is greater than or equal to min_edg then process 900 may continue with a determination as to whether n_edg_p or n_edg_q is equal to min_edg [act 916]. If either n_edg_p or n_edg_q equals min_edg then the decision may be made to set the deblock filter length to an intermediate value [act 918]. For example, in one implementation, deblocker 204 may undertake the determination of act 916 and if that act results in a positive determination then deblocker 204 may set the filter length to an intermediate value of three. The implication of setting the deblock filter length to three will be discussed in more detail below.

If either n_edg_p and/or n_edg_q is greater than min_edg then the decision may be made to set the deblock filter length to a short value [act 920]. For example, in one implementation, deblocker 204 may undertake the determination of act 916 and if that act results in a negative determination then deblocker 204 may set the filter length to equal to a value of two. The implication of setting the deblock filter length to two will be discussed in more detail below.

Returning to act 914, if neither n_edg_p and/or n_edg_q is greater than or equal to min_edg then a decision may be made to set the deblock filter length to a long value [act 926]. For example, in one implementation, deblocker 204 may undertake the determination of act 914 and if that act results in a negative determination then deblocker 204 may set the filter length to equal to a value of four. The implication of setting the deblock filter length to four will be discussed in more detail below.

Returning to act 912, if it is determined that the video data is interlaced then process 900 may continue with a determination of whether n_edg is greater than max_edg [act 922]. If act 922 results in a negative determination (i.e., that n_edg is not greater than max_edg) then the value of BLK determined in act 704 may be left unchanged and the filter length may be set to the long value in act 926. Alternatively, if act 922 results in a positive determination (i.e., that n_edg is greater than max_edg) then the decision may be made to set BLK=BLK/2 (act 924) and then the filter length may be set to the long value in act 926. In one implementation, deblocker 204 may undertake the determination of act 922 and if that act results in a positive determination then deblocker 204 may reduce by one half the BLK artifact strength value determined in act 704.

In accordance with one implementation of the claimed invention, filter length determinations may be undertaken independently for each segment P and Q. Alternatively, in accordance with another implementation of the claimed invention, filter length determinations may be made with respect to either segment P or segment Q and the results applied to deblock filtering of both segments.

Figure 10:
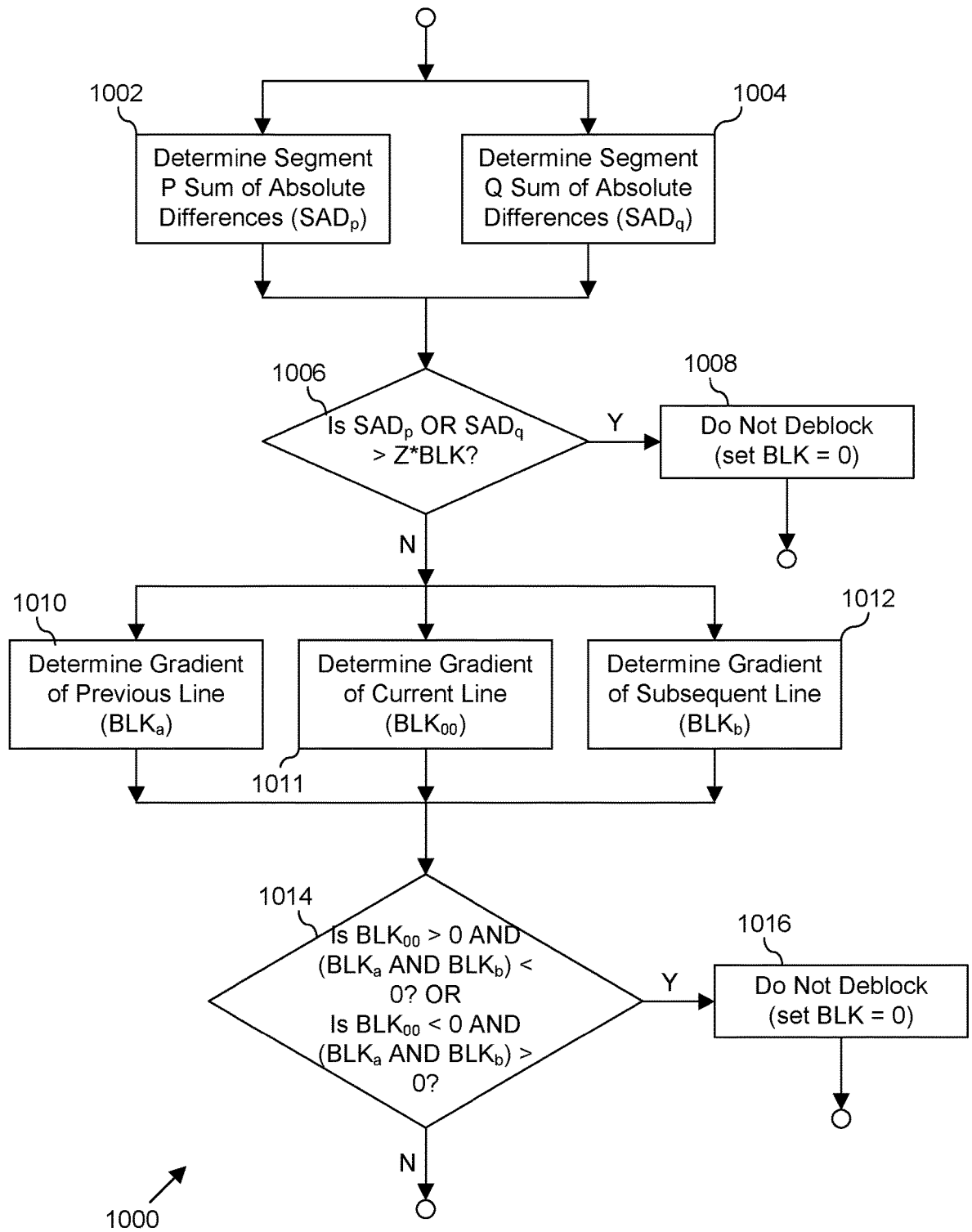

Returning to FIG. 5, process 500 may continue with a determination of the sum of absolute difference (SAD) for certain pixels within the data window [act 514] and/or with a determination of one or more pixel gradients for certain pixels within the data window [act 516]. FIG. 10 illustrates an implementation of a process 1000 for determining SAD and/or pixel gradients in accordance with acts 514 and/or 516. Referring now to FIG. 10, process 1000 may begin with a determination of SAD for both segments P [act 1002] and Q [act 1004]. In one implementation, deblocker 204 may determine the SAD values for the P and Q segments using the following relationships $$SADP = |P0-P1| + |P0-P2| + |P0-P3| + |P0-Pa| + |P0-Pb| \quad (6)$$

$$SADQ = |Q0-Q1| + |Q0-Q2| + |Q0-Q3| + |Q0-Qa| + |Q0-Qb| \quad (7)$$

where P0–P3, Q0–Q3, Pa, Qa, Pb and Qb refer to pixels in segments P and Q as well as pixels above and below those segments as illustrated in FIG. 6B.

Process 1000 may continue with a determination as to whether the quantities SADP and/or SADQ exceeds a constant factor (Z) times the artifact strength BLK [act 1006]. In one implementation, deblocker 204 may undertake the determination of act 1006. If the result of act 1006 is positive then a determination not to deblock that line may be made [act 1008]. One way to disable deblocking in accordance with act 1008 is to have deblocker 204 set BLK equal to zero.

When SADP and/or SADQ significantly exceeds the artifact strength, image texture within the data window being processed may obviate the need to deblock filter that data window. Deblocking may not be necessary in such cases because the actual texture may obscure visual recognition of any block artifacts in that region of the image. Under those circumstances, deblock filtering that data window may also significantly impair visual perception of the texture present in the window. In one implementation, a Z value of three may provide satisfactory protection of any image textures that may exist in the video data being processed (e.g., data window 604).

If the result of act 1006 is negative then a determination of pixel gradients BLKa for the line preceding the line being processed [act 1010], BLK00 for the line currently being processed [act 1011], and/or BLKb for the line subsequent to the line being processed [act 1012] may be undertaken. In one implementation, referring again to the example pixel labeling scheme of FIG. 6B, deblocker 204 may determine BLKa, BLK00 and BLKb using the following respective relationships:

$$BLKa = Pa - Qa \quad (8)$$

$$BLK00 = P0 - Q0 \quad (9)$$

$$BLKb = Pb - Qb \quad (10)$$

Process 1000 may continue with a determination of whether the value of BLK00 has opposite sign to that of BLKa and BLKb (e.g., whether the gradient across the current line is positive while the gradient of both the preceding and subsequent lines is negative) [act 1014]. If the result of act 1014 is positive then the determination may be made to not deblock filter the line being processed [act 1016]. One way to disable deblocking in accordance with act 1016 is to have deblocker 204 set BLK equal to zero. Those of skill in the art will recognize that if both the lines above and below the line currently being deblock filter processed have gradients opposite to that of the current line then any block artifact detected in the current line is likely to be a lonely artifact and it may be better to not expend resources on deblocking such a feature.

Process 500 may continue with a determination of deblock filter correction factors [act 518]. In one implementation, assuming that BLK has not been set equal to zero in acts 910, 1008 and/or 1016, deblocker 204 may determine deblock filter correction factors based, at least in part, on the value of BLK (e.g., as determined and/or set in acts 704, 706 and/or 924) and the filter length as set in acts 918, 920 and/or 926. Deblocker 204 may determine deblock filter correction factors using the following relationship $$\Delta(i) = \{BLK * 1/(2*(1+i))\} | i=0, kP, kQ \quad (11)$$

where $\Delta(i)$ is the correction factor and kP and kQ are the respective P and Q segment filter lengths.

For example, referring also to FIG. 6A, for non-interlaced video data with an intermediate filter length kP=kQ=three (as may be set in act 918), segment P pixels P0, P1 and P2 along with segment Q pixels Q0, Q1 and Q2 may have associated correction factors applied to deblock filter the line being processed. For example, applying equation 12, pixel P2 may be determined to have an additive correction factor $\Delta 2 = BLK/6$ while pixel Q1 may be determined to have a subtractive correction factor $\Delta 1 = BLK/4$. However, these are just illustrative examples and those skilled in the art will recognize that relationships other than equation 11 may be used to determine correction factors in act 518 while remaining within the scope and spirit of the claimed invention.

If, for example, a short filter length kP=kQ=two (as may be set in act 920), segment P pixels P0 and P1 along with segment Q pixels Q0 and Q1 may have associated correction factors applied to deblock filter the line being processed. Similarly, if, for example, a long filter length kP=kQ=four (as may be set in act 920), segment P pixels P0, P1, P2 and P3 along with segment Q pixels Q0, Q1, Q2 and Q3 may have associated correction factors applied to deblock filter the line being processed.

Process 500 may continue with a determination of whether to deblock filter the line being processed [act 520]. If the result of act 520 is positive then process 500 may continue with deblock filtering of the line being processed [act 522]. In one implementation, deblocker 204 may make the determination of act 520 based on the value of BLK: if BLK is greater than zero then deblocker 204 may determine to deblock filter the line and proceed to act 522. If the result of act 520 is negative then process 500 may continue with the provision of the line being processed as output video data [act 528] without the application of deblock filtering to that line.

If deblock filtering is undertaken in act 522 then, in one implementation, deblocker 204 may deblock filter the line being processed using the following relationships $$P(i') = P(i) + / - \Delta(i) \quad (12)$$

$$Q(i') = Q(i) - / + \Delta(i) \quad (13)$$

where Δ(i) are the respective correction factors determined in act 518 and discussed above. For instance, in the example of FIG. 6A, the artifact has positive amplitude (i.e., (P0−Q0)<0) so that application of equations 12 and 13 yields a positive correction to all P(i) and a negative correction to all Q(i). Of course, those skilled in the art will recognize that in circumstances where the artifact has negative amplitude (i.e., (P0−Q0)>0) then the application of equations 12 and 13 yields a negative correction to all P(i) and a positive correction to all Q(i).

Figure 11:
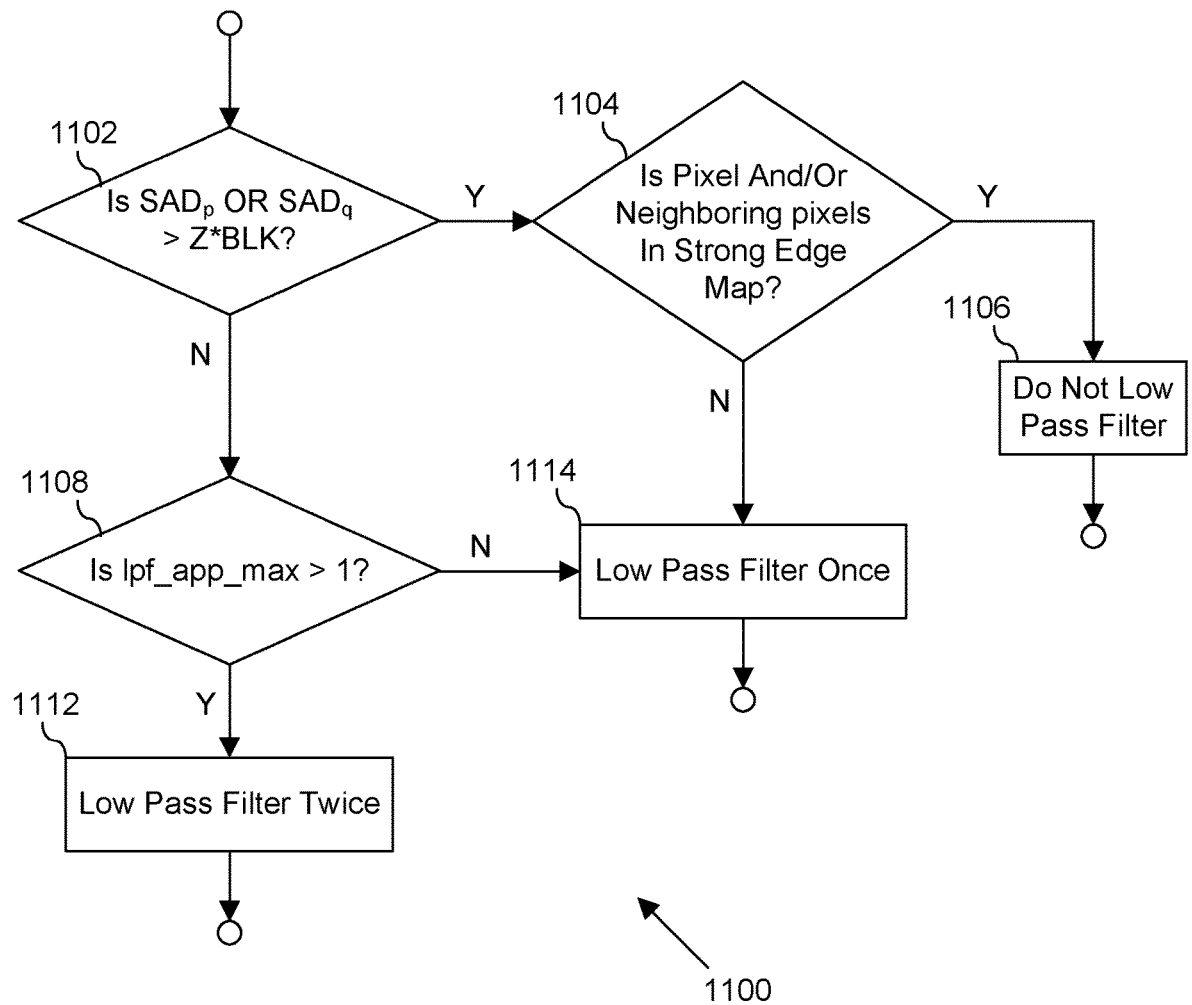

Process 500 may continue with a determination of whether to low-pass filter the line being processed [act 524] and if that determination is positive then low-pass filtering may be applied [act 526]. FIG. 11 is a flow diagram of one implementation of a process 1100 for determining whether to low-pass filter in act 524 and, if so, how to low-pass filter in act 526.

Process 1100 may begin with a determination of whether SADp and/or SADq exceeds a constant (Z) times BLK [act 1102]. In one implementation, deblocker 204 having determined SADP and/or SADQ in respective acts 1002 and/or 1004 of process 1000, may compare SADp and/or SADq to Z*BLK using a value of Z=three. If the result of act 1102 is positive then process 1100 may continue with a determination of whether any of pixels P0, P1 and/or P2 are in the strong edge map generated in act 510 [act 1104]. Act 1104 may also be undertaken in a like manner for pixels of segment Q. One way to implement act 1104 is to have deblocker 204 assess the strong edge map and if any of pixels P0, P1 and/or P2 has a value of one in the strong edge map then deblocker 204 may make a positive determination in act 1104.

If the result of act 1104 is positive then the line being processed may not be low-pass filtered [act 1106]. If the result of act 1104 is negative then the line being processed may be low-pass filtered [act 1114]. In one implementation, deblocker 204 may low-pass filter the line being processed using the following low-pass filter relationship $$s(i')=(1/4)*[s(i-1)+2*s(i)+s(i+1)] \quad (14)$$

where s(i−1), s(i), and s(i+1) are the respective values of pixels P2, P1 and/or P0 (and/or Q2, Q1 and/or Q0).

If the result of act 1102 is negative then a determination may be made as to whether lpf_app_max is greater than one [act 1108]. In one implementation, lpf_app_max may be a factor associated with and/or accessible by deblocker 204 that may be used to specify the number of times low-pass filtering should be applied. If the determination of act 1108 is negative then low-pass filtering may be applied once [act 1114]. If the determination of act 1108 is positive then low-pass filtering may be applied twice [act 1112] using the filter of equation 14.

Returning to FIG. 5, process 500 may conclude with a provision of output video line(s) [act 528]. One way to do this is to have deblocker 204 of video processor 102 provide deblock processed video lines to image output device 108 in the form of deblocked video data. Alternatively, deblocker 204 may provide the deblock processed video lines to other video data processing modules (not shown) of video processor 102 for further video data processing. In one implementation, although the claimed invention is not limited in this regard, deblocker 204 may wait until all lines in video data window 604 have been deblock processed before outputting all lines of window 604 as output video data in act 528. Alternatively, deblocker 204 may provide each processed line of video data as output video data in act 528 when that line has been processed through to act 528.

While process 500 has been described with respect to processing of segments P and Q within a single data window 604, those skilled in the art will recognize that process 500 can also be undertaken in a serial and/or a parallel manner for two or more data windows, for two or more line segments within two or more data windows, in both vertical and horizontal filtering directions in parallel, etc. Clearly, many processing schemes other than process 500 may be implemented consistent with the scope and spirit of the claimed invention. For example, in various implementations of the invention all eight lines within a data window 604 may be processed sequentially, or each line within window 604 may be processed by one of PEs 402-416 while other lines of window 604 may be processed in parallel by others of PEs 402-416, etc. As those skilled in the art will recognize, the exact scheme employed may depend upon such things as the architecture used to implement processes such as process 500, memory constraints within such architectures etc. However, the structural details of such schemes are not limiting on the claimed invention.

The acts shown in FIGS. 5-11 need not be implemented in the order shown; nor do all of the acts necessarily need to be performed. Also, those acts that are not dependent on other acts may be performed in parallel with the other acts. For example, the determination of SAD in act 514 and of strong edges in act 510 may be undertaken in parallel. Moreover, some acts of process 500 may be implemented in hardware and/or firmware (e.g., determining SAD in act 514, determining edges in acts 508/510, etc.), while other acts may be implemented in software (e.g., decisions 520 and/or 524). Further, at least some of the acts in this figure may be implemented as instructions, or groups of instructions, implemented in a machine-readable medium.

The foregoing description of one or more implementations consistent with the principles of the invention provides illustration and description, but is not intended to be exhaustive or to limit the scope of the invention to the precise form disclosed. Modifications and variations are possible in light of the above teachings or may be acquired from practice of various implementations of the invention. Clearly, many implementations may be employed to provide a method and apparatus to adaptively reduce blocking artifacts in block-coded video consistent with the claimed invention.

No element, act, or instruction used in the description of the present application should be construed as critical or essential to the invention unless explicitly described as such. Also, as used herein, the article "a" is intended to include one or more items. In addition, some terms used to describe implementations of the invention, such as "data" and "value," may be used interchangeably in some circumstances. For example, those skilled in the art will recognize that the terms "error data" and "error value" may be used interchangeably without departing from the scope and spirit of the invention. Moreover, when terms such as "coupled" or "responsive" are used herein or in the claims that follow, these terms are meant to be interpreted broadly. For example, the phrase "coupled to" may refer to being communicatively, electrically and/or operatively coupled as appropriate for the context in which the phrase is used. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A system, comprising:
   memory to store at least first and second adjacent blocks of a video frame with a block boundary therebetween, the first block comprising a first line of video and the second block comprising a second line of video across the block boundary from the first line of video; and
   a processor to:
   determine a deblock filter correction factor for the first line of video, the deblock filter correction factor dependent on a filter length of a selected deblock filter to deblock filter the first line of video; and
   apply the deblock filter correction factor to at least a first pixel value of the first line of video as part of application of the selected deblock filter.

2. The system of claim 1, wherein the deblock filter correction factor is further dependent on a field code artifact strength of the first and second blocks.

3. The system of claim 2, wherein the field code artifact strength is based on a difference between one or more pixel values of the first line of video and one or more pixel values of the second line of video.

4. The system of claim 2, wherein the deblock filter correction factor is proportional to the field code artifact strength.

5. The system of claim 1, wherein the deblock filter correction factor is applied to the first pixel value in response to the filter length, and no block filter correction factor is applied to a second pixel value the first line of video in response to the filter length being less than a threshold.

6. The system of claim 1, wherein the deblock filter correction factor is zero in response to the filter length being less than or equal to the number of pixels between a first pixel corresponding to the first pixel value and the block boundary.

7. The system of claim 6, wherein the deblock filter correction value is proportional to a field code artifact strength of the first and second blocks in response to the filter length being greater than the number of pixels between the first pixel and the block boundary.

8. The system of claim 1, further comprising
   a display device to present deblock filtered video.

9. A method comprising:
   receiving at least first and second adjacent blocks of a video frame with a block boundary therebetween, the first block comprising a first line of video and the second block comprising a second line of video across the block boundary from the first line of video;
   determining a deblock filter correction factor for the first line of video, the deblock filter correction factor dependent on a filter length of a selected deblock filter to deblock filter the first line of video; and
   applying the deblock filter correction factor to at least a first pixel value of the first line of video as part of application of the selected deblock filter.

10. The method of claim 9, wherein the deblock filter correction factor is further dependent on a field code artifact strength of the first and second blocks.

11. The method of claim 10, wherein the field code artifact strength is based on a difference between one or more pixel values of the first line of video and one or more pixel values of the second line of video.

12. The method of claim 10, wherein the deblock filter correction factor is proportional to the field code artifact strength.

13. The method of claim 9, wherein the deblock filter correction factor is zero in response to the filter length being less than or equal to the number of pixels between a first pixel corresponding to the first pixel value and the block boundary.

14. The method of claim 13, wherein the deblock filter correction value is proportional to a field code artifact strength of the first and second blocks in response to the filter length being greater than the number of pixels between the first pixel and the block boundary.

15. At least one non-transitory machine readable medium comprising a plurality of instructions that, in response to being executed on a device, cause the device to code video by:
   receiving at least first and second adjacent blocks of a video frame with a block boundary therebetween, the first block comprising a first line of video and the second block comprising a second line of video across the block boundary from the first line of video;
   determining a deblock filter correction factor for the first line of video, the deblock filter correction factor dependent on a filter length of a selected deblock filter to deblock filter the first line of video; and
   applying the deblock filter correction factor to at least a first pixel value of the first line of video as part of application of the selected deblock filter.

16. The one non-transitory machine readable medium of claim 15, wherein the deblock filter correction factor is further dependent on a field code artifact strength of the first and second blocks.

17. The one non-transitory machine readable medium of claim 15, wherein the field code artifact strength is based on a difference between one or more pixel values of the first line of video and one or more pixel values of the second line of video.

18. The one non-transitory machine readable medium of claim 16, wherein the deblock filter correction factor is proportional to the field code artifact strength.

19. The one non-transitory machine readable medium of claim 15, wherein the deblock filter correction factor is zero in response to the filter length being less than or equal to the number of pixels between a first pixel corresponding to the first pixel value and the block boundary.

20. The one non-transitory machine readable medium of claim 19, wherein the deblock filter correction value is proportional to a field code artifact strength of the first and second blocks in response to the filter length being greater than the number of pixels between the first pixel and the block boundary.

* * * * *